(12) United States Patent
Martini et al.

(10) Patent No.: US 9,900,328 B2
(45) Date of Patent: *Feb. 20, 2018

(54) WEB REDIRECTION FOR CONTENT SCANNING

(71) Applicant: iBoss, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,687

(22) Filed: Mar. 27, 2017

(65) Prior Publication Data

US 2017/0201539 A1   Jul. 13, 2017

Related U.S. Application Data

(63) Continuation of application No. 14/810,319, filed on Jul. 27, 2015, now Pat. No. 9,609,016, which is a
(Continued)

(51) Int. Cl.
*H04L 29/06* (2006.01)
*G06F 17/30* (2006.01)
(Continued)

(52) U.S. Cl.
CPC .... *H04L 63/1416* (2013.01); *G06F 17/30887* (2013.01); *G06F 21/53* (2013.01);
(Continued)

(58) Field of Classification Search
CPC ... H04L 63/1416; H04L 67/42; H04L 63/145; H04L 63/0227; H04L 67/02;
(Continued)

(56) References Cited

U.S. PATENT DOCUMENTS 6,654,807 B2   11/2003   Farber et al.
9,094,443 B1 *   7/2015   Martini ............... H04L 63/1416
(Continued)

OTHER PUBLICATIONS

Configuring Web Cache Services Using WCCP, http://www.cisco.com/c/en/us/td/docs/ios/12_2/configgun/configuration/guide/ffun_c/fcf018.html, Jun. 2, 2014, 7 pages.
(Continued)

*Primary Examiner* — Matthew Smithers
(74) *Attorney, Agent, or Firm* — Fish & Richardson P.C.

(57) ABSTRACT

This specification generally relates to using redirect messages to implement content scanning. One example method includes receiving from a client a first request for a network resource, the first request including an original location of the network resource; determining that a response to the first request is to be analyzed; sending a redirect response to the client including a modified location for the network resource different than the original location; receiving a second request for the network resource from the client, the second request including the modified location; in response to receiving the second request for the network resource from the client: retrieving the network resource from the original location; determining that the retrieved network resource is suitable to send to the client; and in response to determining that the retrieved network resource is suitable, sending the retrieved network resource to the client.

20 Claims, 6 Drawing Sheets

Related U.S. Application Data continuation of application No. 14/497,246, filed on Sep. 25, 2014, now Pat. No. 9,094,443.

(60) Provisional application No. 62/031,080, filed on Jul. 30, 2014.

(51) Int. Cl.
  *G06F 21/53* (2013.01)
  *H04L 29/08* (2006.01)
  *H04W 12/08* (2009.01)

(52) U.S. Cl.
  CPC ........ *H04L 63/0227* (2013.01); *H04L 63/145* (2013.01); *H04L 67/02* (2013.01); *H04L 67/2814* (2013.01); *H04L 67/42* (2013.01); *H04W 12/08* (2013.01)

(58) Field of Classification Search
  CPC ................ H04L 67/2814; H04W 12/08; G06F 17/30887; G06F 21/53
  See application file for complete search history.

(56) References Cited

U.S. PATENT DOCUMENTS

| | | | |
|---|---|---|---|
| 9,609,016 B2 * | 3/2017 | Martini | H04L 63/1416 |
| 2002/0138660 A1 * | 9/2002 | Eilers | G06F 9/5055 |
| | | | 719/313 |
| 2002/0178381 A1 * | 11/2002 | Lee | G06F 21/566 |
| | | | 726/12 |
| 2003/0023866 A1 | 1/2003 | Hinchliffe | |
| 2010/0088335 A1 | 4/2010 | Mimatsu | |
| 2011/0030058 A1 * | 2/2011 | Ben-Itzhak | G06F 21/51 |
| | | | 726/24 |
| 2011/0276716 A1 * | 11/2011 | Coulson | G06F 17/30887 |
| | | | 709/238 |
| 2011/0282997 A1 | 11/2011 | Prince | |
| 2011/0307622 A1 | 12/2011 | Williams | |
| 2013/0097666 A1 * | 4/2013 | Wu | H04L 63/14 |
| | | | 726/1 |
| 2013/0145437 A1 * | 6/2013 | Zaitsev | G06F 21/56 |
| | | | 726/4 |
| 2013/0305346 A1 * | 11/2013 | Krywaniuk | H04L 63/0245 |
| | | | 726/12 |
| 2013/0333028 A1 | 12/2013 | Hagar et al. | |
| 2014/0007239 A1 | 1/2014 | Sharpe et al. | |

OTHER PUBLICATIONS

Configuring WCCP, Cisco Systems, Inc., Nov. 16, 2011, 34 pages.
Redirect caching deep dive, http://www.stevesouders.com/blog/2010/07/23/redirect-caching-deep-dive/, Jul. 23, 2010, 2 pages.
Young, International Search Report in corresponding PCT Application No. PCT/US2015/42995 dated Oct. 29, 2015, 11 pages.

* cited by examiner

WEB REDIRECTION FOR CONTENT SCANNING

CROSS REFERENCE TO RELATED APPLICATIONS

This application is a continuation of and claims the benefit of U.S. patent application Ser. No. 14/810,319, filed Jul. 27, 2015, which is a continuation of U.S. patent application Ser. No. 14/497,246, filed Sep. 25, 2014, which claims the benefit of priority to U.S. Provisional Patent Application No. 62/031,080, filed Jul. 30, 2014, which are hereby incorporated by reference.

BACKGROUND

This specification generally relates to using redirect messages to implement content scanning.

The Internet is a global network of computers that provide information, such as web pages, to clients in response to requests. In some cases, this provided information may be cached in a location that can be accessed more quickly by clients than the computer that provided the information, such as a cache server. Subsequent requests for the same information may be fulfilled by the cache server rather than the remote computer, which may lead to the information being returned to the client faster.

SUMMARY

In general, one aspect of the subject matter described in this specification may be embodied in systems, and methods performed by data processing apparatuses that include the actions of receiving from a client a first request for a network resource, the first request including an original location of the network resource; determining that a response to the first request is to be analyzed; in response to determining that the response to the first request is to be analyzed, sending a redirect response to the client including a modified location for the network resource different than the original location; receiving a second request for the network resource from the client, the second request including the modified location; in response to receiving the second request for the network resource from the client: retrieving the network resource from the original location; determining that the retrieved network resource is suitable to send to the client; and in response to determining that the retrieved network resource is suitable, sending the retrieved network resource to the client.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
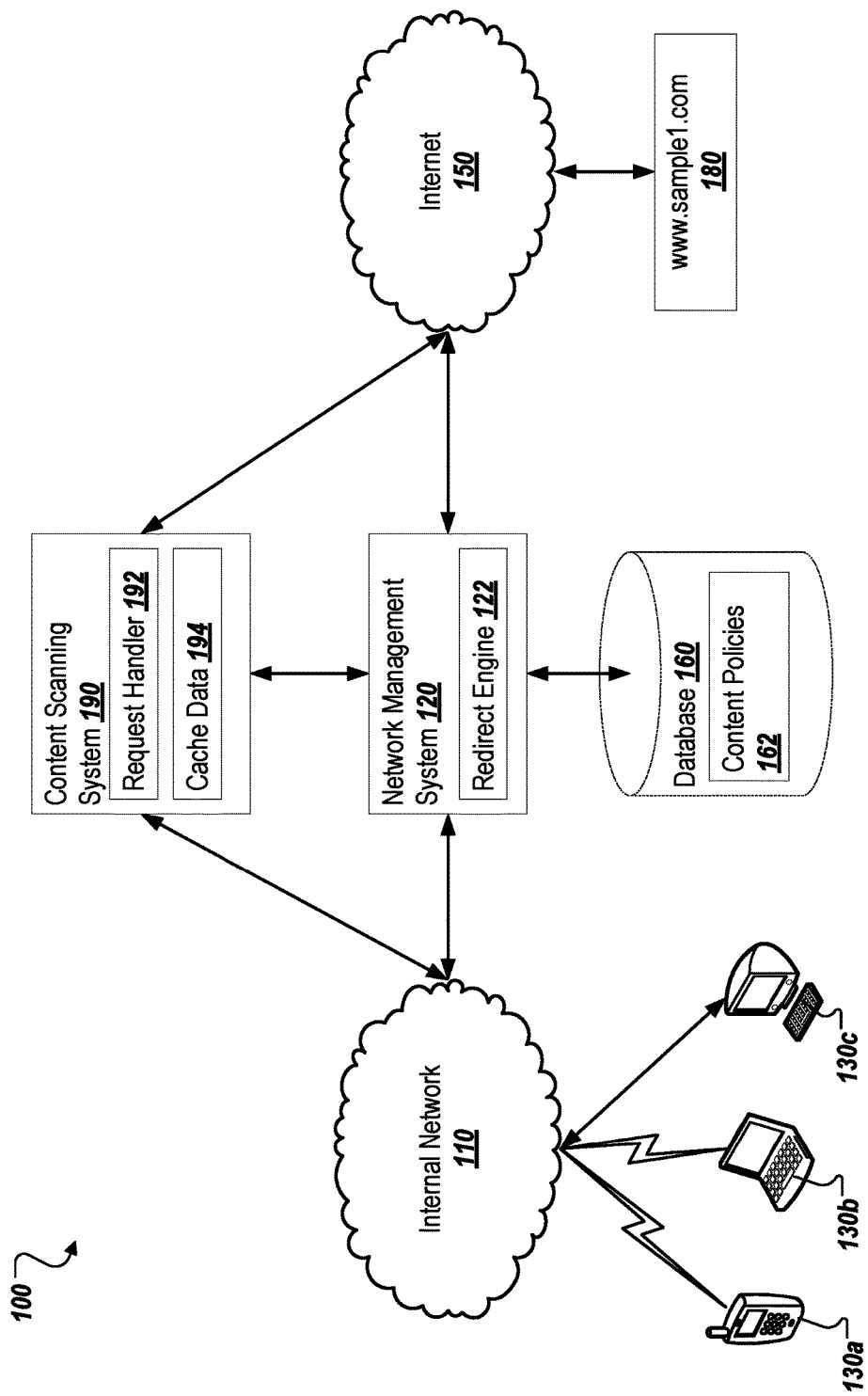
FIG. 1 is a diagram of an example environment.

The present disclosure generally relates to techniques for using redirection of client requests to perform content scanning. Many network protocols, such as Hypertext Transfer Protocol (HTTP), include redirection mechanisms allowing a server to instruct a client to fetch requested content from an alternate location, such as a different server identified by a different Uniform Resource Locator (URL). The present techniques selectively utilize these redirection mechanisms to direct client requests to a separate system that retrieves the requested content on behalf of the client. This configuration allows the requested content to be analyzed to determine whether the content is safe or otherwise suitable to return to the requesting client.

One example technique according to the present disclosure includes receiving from a client a first request for a network resource including an original location of the network resource. A determination may then be made that a response to the first request is to be analyzed, such as, for example, to determine if the response is suitable to return to the client. The determination may be based on the type of network resource requested, the original location of the resource, on the particular client making the request, or on other factors.

In response to determining that the response to the first request is to be analyzed, a redirect response is sent to the client including a modified location for the network resource different than the original location. In some cases, the modified location may be associated with a content scanning system operable to scan the requested content. A second request for the network resource is then received from the client including the modified location. In response to this second request, the network resource may be retrieved from the original location, and scanned or analyzed to determine whether it is suitable to return to the client. Suitability may be determined based on the results of a virus scan of the retrieved resource, on an analysis of the content of the retrieved resource, or on other factors. For example, if a virus scan of the retrieved resource reveals that the retrieved resource contains a harmful virus, then the retrieved resource would be deemed unsuitable, whereas if no virus if found the retrieved resource would be deemed suitable. Other examples of suitability analysis include inspecting the resource for objectionable content (e.g., pornography), prohibited subjects (e.g., terrorism), or other prohibited content and determining that the retrieved resource is not suitable if any such content is found. In general, essentially any appropriate, objective criteria can be used to perform the suitability analysis. In response to determining that the retrieved network resource is suitable, the retrieved network resource may be sent to the client.

The techniques described herein may provide several advantages. By using widely supported and well-known redirection mechanisms of standard protocols rather than custom protocols, the techniques described herein may be more widely applicable than previous techniques. The techniques also may allow for more flexible and configurable implementations of content scanning by allowing the decision to redirect to be made by a network management system rather than based on local rules stored at the client, or based on configuration specific to a particular application.

FIG. 1 is a diagram of an example environment 100. As shown, the example environment includes one or more devices 130a-c connected to an internal network 110. A network management system 120 and a scanning system 190 also connected to the internal network 110. Network management system 110 is connected to a database 160. The scanning system 190 and the network management system 120 connected to the Internet 150. A website 180 is connected to the Internet 150. In operation, one of the devices 130a-c may send a request to the website 180 via the internal network 110. For example, a device may send an HTTP GET request including the URL of the resource hosted by the website 180. Network management system 120 may intercept the request, and determine that the request is configured to be scanned. The network management system 120 may send a redirect message to the requesting device directing the device to the scanning system 190. For example, the network management system 120 may send an HTTP response indicating that a redirect should occur including a new URL for the device to request. The new URL may identify the scanning system 190, and may include an indication of the original URL that was requested. The requesting device may then send another request for the website 180 through the scanning system 190. The scanning system 190 may determine that it has a stored copy of the response to the request, and may return the stored copy to the requesting device. The scanning system 190 may also determine that it does not have a stored copy of the response to the request, and may forward the request to the website 180 via the Internet 150. The website 180 may respond to the request with a response, such as, for example, a webpage or other resource specified in the request. The scanning system 190 may receive this response from the website 180, and scan the response to determine if it is suitable to return to the requesting device. The process is described in greater detail below. If the response is determined to be suitable, the scanning system 190 may then return the response to the requesting device over the internal network 110. The scanning system 190 may also store the response so that it may respond to future requests with the stored copy.

As shown, the environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Even though any device within range may connect to the internal network 110 in such configurations, the device still may be required to authenticate in order to access resources on the internal network 110 and/or on the Internet 150. Such a configuration is often referred to as a Bring Your Own Device (BYOD) network in which users are free to use their own personal devices for connecting to the network. In some implementations, the entity that controls the internal network 110 may issue devices to users for use on the internal network 110. The internal network 110 may also be a wired network, such as an Ethernet network.

Environment 100 also includes one or more devices 130 a-c. In some implementations, the one or more devices 130a-c include mobile devices, such as cellular telephones (e.g., 130a), smartphones, tablets, laptops (e.g., 130b) and other similar computing devices. The one or more devices 130a-c may also include wired devices such as desktop computer 130c. The one or more devices 130a-c may also include servers. In some implementations, the one or more devices 130a-c include personal devices associated with one or more users. The one or more devices 130a-c may also include devices issued or owned by the entity that provides the internal network 110, such as company-issued smartphones or laptops. In some implementations, the one or more devices 130a-c may include network access or web browsing software (e.g., a web browser) for accessing resources on the Internet 150.

In some implementations, the devices 130a-c may include networking software configured to request websites from the Internet 150. For example, the devices 130a-c may include web browser software allowing a user to browse websites on the Internet 150. The web browser software may send requests for various resources from the websites, including, but not limited to, webpages, images, videos, software programs, files, and other types of resources. In some cases, the devices 130a-c may send requests and receive responses using the HTTP protocol. The devices 130a-c may also sin request and receive responses according to other network protocols, including, but not limited to, File Transfer Protocol (FTP), Simple Object Access Protocol (SOAP), Remote Procedure Call (RPC), or other protocols.

In some cases, the devices 130a-c may be configured to access the Internet 150 through the network management system 120, such as, for example, by the network management system 120 be configured as the default gateway to access the Internet 150. Clients 130a-c may also be configured to access the network management system 120 as a proxy server. In some implementations, the devices 130a-c may access the Internet 150 through a separate gateway (not shown), and the network management system 120 may passively monitor the requests and responses.

The environment 100 includes a network management system 120. In some implementations, the network management system may be a server or set of servers connected to the internal network 110. The network management system may be configured as a gateway between the internal network 110 and the Internet 150, such that traffic directed to the Internet 150 passes through the network management system 120. The network management system 120 may also be configured to passively monitor traffic on the internal network 110, such as in a tap or span configuration. In some implementations, the network management system 120 may receive part of the traffic directed to the Internet 150, such that certain traffic passes through the network management system 120, and other traffic does not pass through the network management system 120. In some implementations, the DNS functionality and the monitoring functionality of the network management system 120 may be implemented on separate servers in communication and coordination with one another.

The network management system 120 includes a redirect engine 122. In operation, the redirect engine 122 identifies requests from the devices 130a-c for resources on the Internet 150. The redirect engine 122 may determine that a particular request is configured to be scanned, such as by consulting content policies 162 stored in the database 160. The redirect engine 122, in response to determining that a request is configured to be scanned, may send a redirect response to the requesting device instructing the device to request the resource from the scanning system 190.

For example, the device 130a may send an HTTP GET request over the internal network 110 directed to the website 180. The HTTP GET request may include the URL "www.sample1.com/hello.gif," indicating that the request is for an image named "hello.gif" from the website 180. The network management system 120 may receive HTTP GET request from the internal network 110. The redirect engine 122 may parse the HTTP GET request, and determine that the request should be redirected to the scanning system 190. In some cases, the determination may be made based on the content policies 162, which are described in greater detail below. In response to determining that the request should be redirected, the redirect engine 122 generates an HTTP redirect response including a URL associated with the scanning system 190 (e.g., "scanner.com"). In some cases, the URL may also include the URL from the original HTTP GET request (e.g., "http://scanner.com/r?url=www.sample1.com/hello.gif"). This may allow the scanning system 190 to determine what resource the device 130a is requesting.

In some implementations, the HTTP redirect response generated by the redirect engine 122 may be a "307 temporary redirect" response including the URL, which may be formatted as follows:

---
HTTP/1.1 307 temporary redirect
Refresh:0;url=http:// scanner.com/r?url=www.sample1.com/hello.gif

---

The first line of the response includes a version indicator ("HTTP/1.1") and a response code ("307 temporary redirect"). The second line of the response includes a refresh header indicating that the device should request the URL "http://scanner.com/r?url=www.sample1.com/hello.gif" after a delay of zero seconds. In some cases, HTTP redirect response generated by the redirect engine 122 may be a "200 OK" response including a refresh header.

In some cases, the redirect engine 122 may return a Hypertext Markup Language (HTML) document including an HTML meta-tag redirecting the browser to a new URL, as shown in the following example:

---
```
<html>
<head>
<meta http-equiv="Refresh" content="0; url=http://
scanner.com/r?url=www.sample1.com/hello.gif " />
</head>
<body>
<p>Please follow <a href=" http://
scanner.com/r?url=www.sample1.com/hello.gif ">this link</a>.</p>
</body>
</html>
```
---

The tag "<meta http-equiv="Refresh">" instructs a browser rendering the HTML to immediately request the specified URL. In some implementations, the redirect engine 122 may use additional techniques to cause the device 130a to request a different URL, including, but not limited to, a "302 found" response, a "301 moved permanently" response, a "303 see other" response, other HTTP responses including a refresh header, or other techniques.

The environment 100 also includes a database 160. In some implementations, the database 160 may be stored on the same server as the network monitoring system 120. The database 160 may also be stored on a separate server and accessed by the network monitoring system 120 over a network. The database 160 may be any proprietary or commercially available database system or format, including, but not limited to, MySQL®, Microsoft® SQLServer, IBM® DB2, Oracle®, SQLite, or any other suitable database system or format. The database 160 may also be a distributed database running on a plurality of servers. In some implementations, the database 160 may be a configuration file or set of configuration files associated with the network monitoring system 120.

The database 160 may include configuration information specifying to the network management system 120 which requests should be redirected to the scanning system 190. The configuration information may include content policies 162, or other configuration information related to content scanning. The configuration information may specify particular network addresses, domain names, request types, requested resource types (e.g., file types by extension), or other objective criteria indicating requests that should be redirected to the scanning system 190.

Environment 100 includes the scanning system 190. In operation, the scanning system 190 may receive requests from the devices 130a-c set in response to the redirect from a network management system 120. For example the scanning system 190 may determine whether a resource specified in the request is stored in the cache data 194. If the resource is not stored, the scanning system 190 may retrieve the resource from the Internet 150, and perform analysis on it to determine whether it is suitable to provide to the requesting device based on objective criteria. For example, the scanning system 190 may perform a virus scan on the requested resource, and may determine that the resource is suitable to provide to the requesting device based on the results of the virus scan (e.g., the resource is suitable if no viruses are detected). The scanning system 190 may also analyze the content of the retrieved resource, and may determine that the resource is suitable to provide to the requesting device based on the results of the virus scan (e.g., the resource is suitable if no prohibited content, such as pornography, is detected). In some cases, the scanning system 190 may consult the content policies 162 to determine whether the retrieved resource is suitable, such as, for example, by consulting a definition of prohibited content in the content policies 162. For example, the content policies 162 may include a set of prohibited words, prohibited images, prohibited content subjects, prohibited file types, prohibited actions (such as scripting actions embedded in a web page), or other definitions. The scanning system 190 may, in the case of a request for an executable software program, execute the software program and observe its behavior to determine whether it is suitable, such as, for example, by executing the software program in a virtual machine.

In some cases, the scanning system 190 may include one or more storage devices for storing the requested content (not shown). These storage devices may include, but are not limited to, databases, file systems, memory devices, hard drives, cloud storage systems, or other devices.

Figure 2:
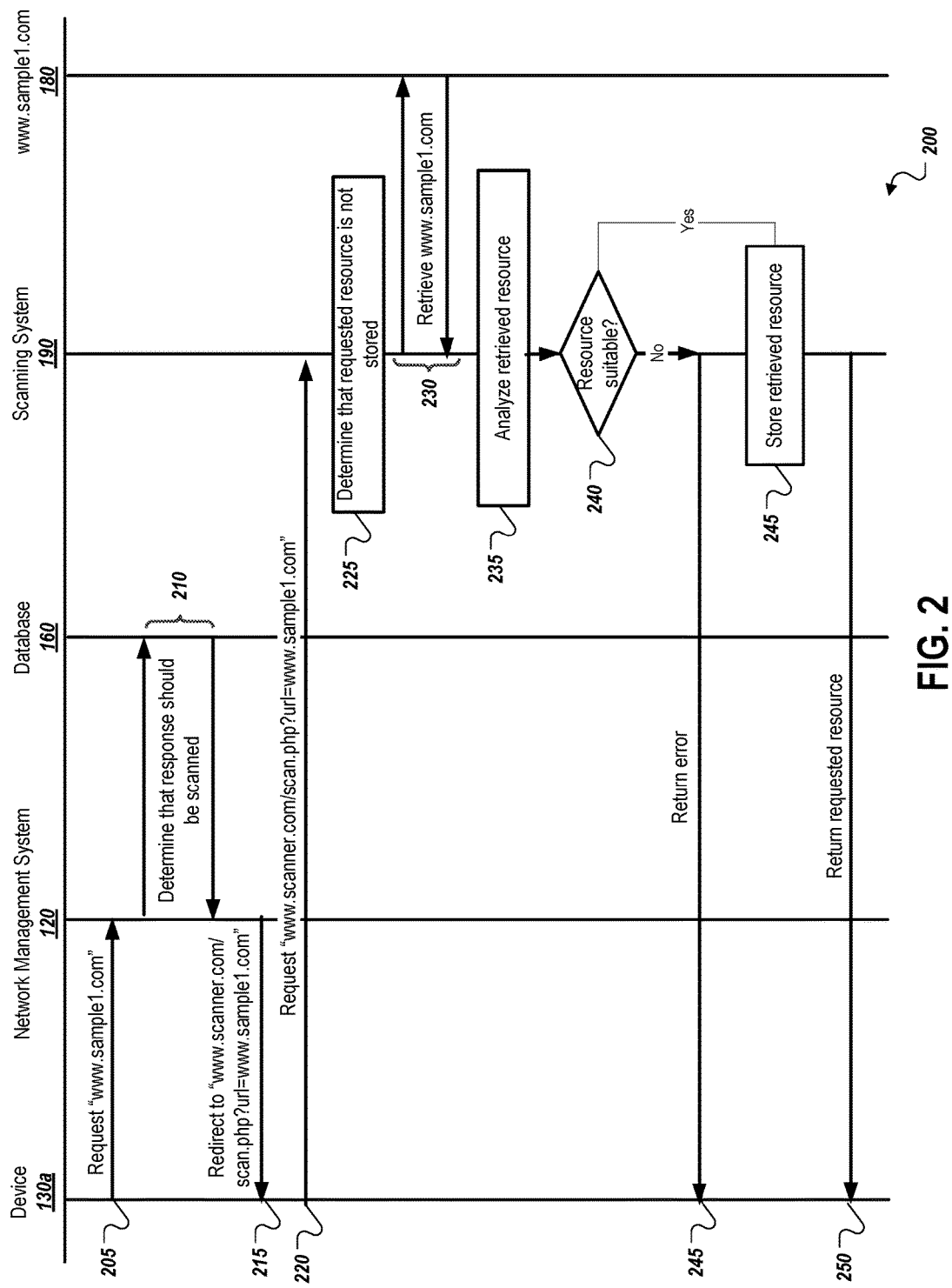
FIG. 2 is a message flow diagram of an example interaction between the components of the example environment to implement content scanning using redirect messages.

FIG. 2 is a message flow diagram of an example interaction 200 between the components of the example environment to implement caching using redirect messages. The 205, the device 130a sends a request for resource with the URL "www.sample1.com." In some cases, the request is an HTTP GET request. The request may also be formatted according to other network protocols, such as those described herein.

At 210, the network management system 120 interacts with the database 160 to determine that a response to the request should be scanned. For example, the network management system 120 may query and examine the content policies 162 to determine whether the request should be scanned, as described previously relevant FIG. 1.

At 215, the network management system 120 redirects the device 130a to an alternate URL associated with the scanning system 190. In some cases, this alternate URL may reference a resource on the scanning system 190 configured to perform the scanning functionality. The alternate URL may also include the original URL requested by the device 130a at 205. In some cases, the network management system 120 redirects the device 130a by sending an HTTP redirect response. The redirect response may also be formatted according to other network protocols, such as those described herein.

At 220, the device 130a sends a second request for the alternate URL to the scanning system 190. In some implementations, the device 130a may perform a DNS lookup on a domain name included in the alternate URL to determine the address of the scanning system 190. At 225, the scanning system 190 determines that a response to the request sent at 205 is not stored by the scanning system 190. At 230, the scanning system 190 retrieves the requested resource from the website 180 denoted by the domain name "www.sample1.com."

At 235, the retrieved resources analyzed or scanned, such as, for example, according to the techniques described relative to FIG. 1. At 240, a determination is made whether the retrieved resource is suitable to return to the device 130a. If the scanning system 190 determines that the resource is not suitable to return to the device 130a, the scanning system 190 returns an error indication to the device 130a (245). In some cases, the error returned by the scanning system 190 may be an HTTP response including an error code (e.g., 404).

If the resource is determined to be suitable, the scanning system 190 stores the response received from the website 180 (245). At 250, the scanning system 190 returns the response received from the website 180 to device 130a.

Figure 3:
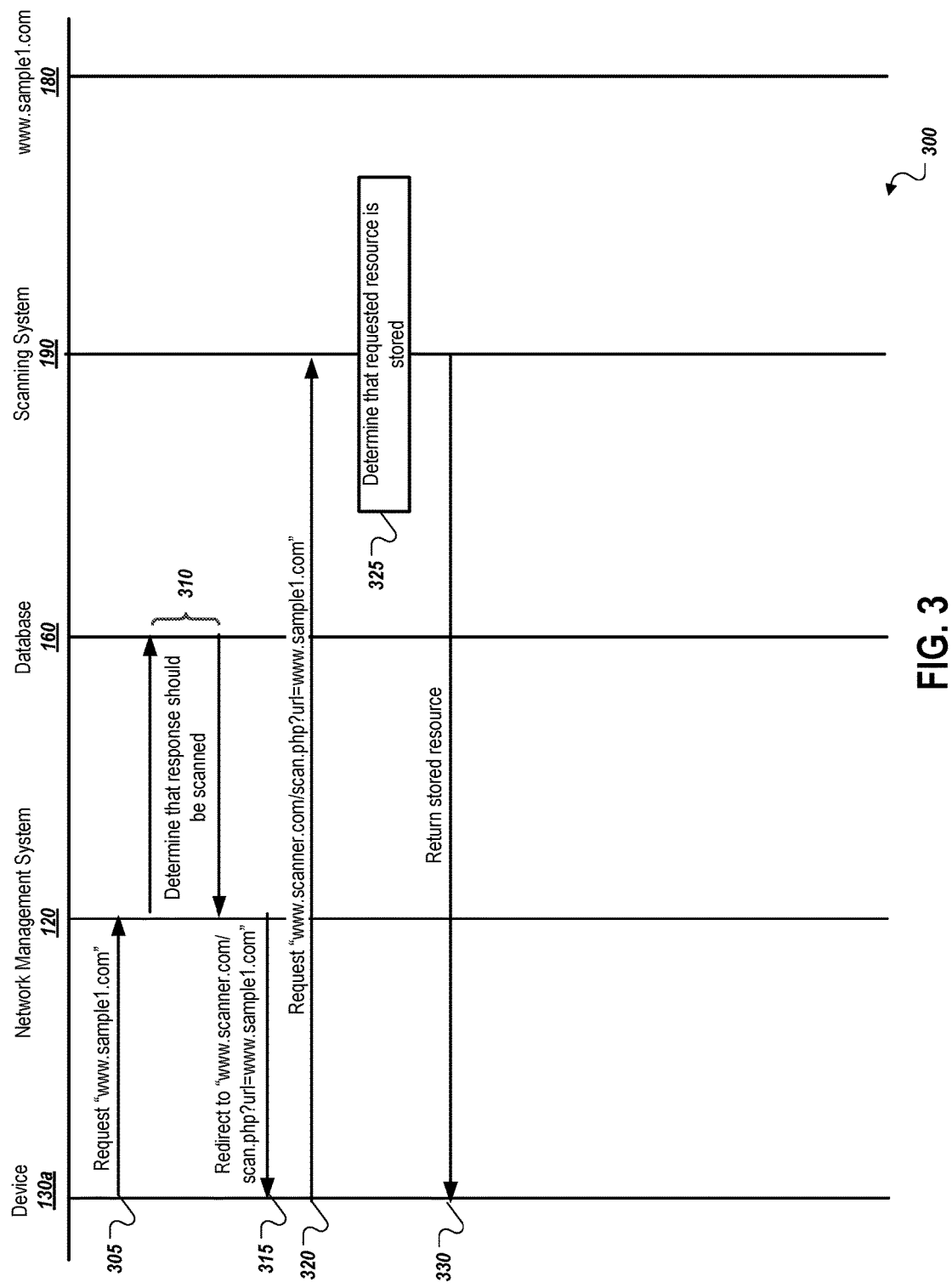
FIG. 3 is a message flow diagram of an example interaction between the components of the example environment to implement content scanning using redirect messages showing a case where a response to the particular request has been previously stored.

FIG. 3 is a message flow diagram of an example interaction 300 between the components of the example environment to implement content scanning using redirect messages showing a case where a response to the particular request has been previously stored. The 305, the device 130a sends a request for resource with the URL "www.sample1.com." In some cases, the request is an HTTP GET request. The request may also be formatted according to other network protocols, such as those described herein.

At 310, the network management system 120 interacts with the database 160 to determine that a response to the request should be scanned. For example, the network management system 120 may query and examine the content policies 162 to determine whether the request should be scanned, as described previously relevant FIG. 1.

At 315, the network management system 120 redirects the device 130a to an alternate URL associated with the scanning system 190. In some cases, this alternate URL may reference a resource on the scanning system 190 configured to perform the scanning functionality. The alternate URL may also include the original URL requested by the device 130a at 305. In some cases, the network management system 120 redirects the device 130a by sending an HTTP redirect response. The redirect response may also be formatted according to other network protocols, such as those described herein.

At 320, the device 130a sends a second request for the alternate URL to the scanning system 190. In some implementations, the device 130a may perform a DNS lookup on a domain name included in the alternate URL to determine the address of the scanning system 190. At 325, the scanning system 190 determines that a response to the request sent at 305 is stored by the scanning system 190. At 330, the scanning system 190 returns the stored response to the client.

In some implementations, the scanning system 190 may not store responses from the website 180, and may perform the suitability analysis on responses as they are received from the website 180. In such a case, the scanning system 190 may for responses from the website 180 that are suitable to the device 130a. In some cases, the scanning system 190 may store the retrieved resource for a configured period of time, after which the stored resource is deleted, causing it to be retrieved again and analyzed in response to the next request for the resource.

Figure 4:
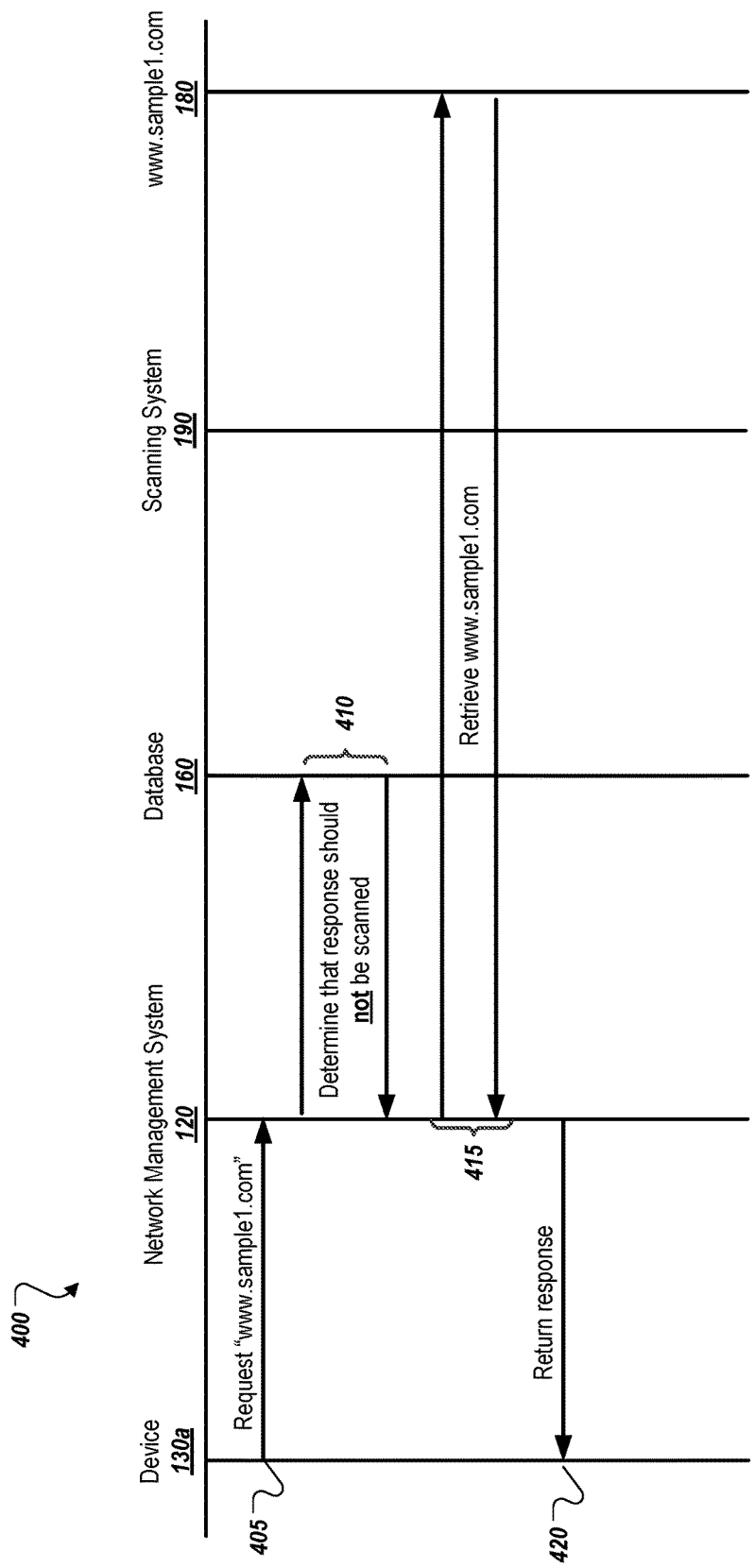
FIG. 4 is a message flow diagram of an example interaction between the components of the example environment showing a case where content scanning is not enabled for a particular request.

FIG. 4 is a message flow diagram of an example interaction 400 between the components of the example environment showing a case where content scanning is not enabled for a particular request. At 405, the device 130a the device 130a sends a request for resource with the URL "www.sample1.com." At 410, the network management system 120 consults the database 160 to determine that the response to the request should not be scanned. At 415, the network management system 120 forwards the request received at 305 to the website 180 and receives a response from the website 180. At 420, the network management system 120 returns the response received from the website 180 to the device 130a.

Figure 5:
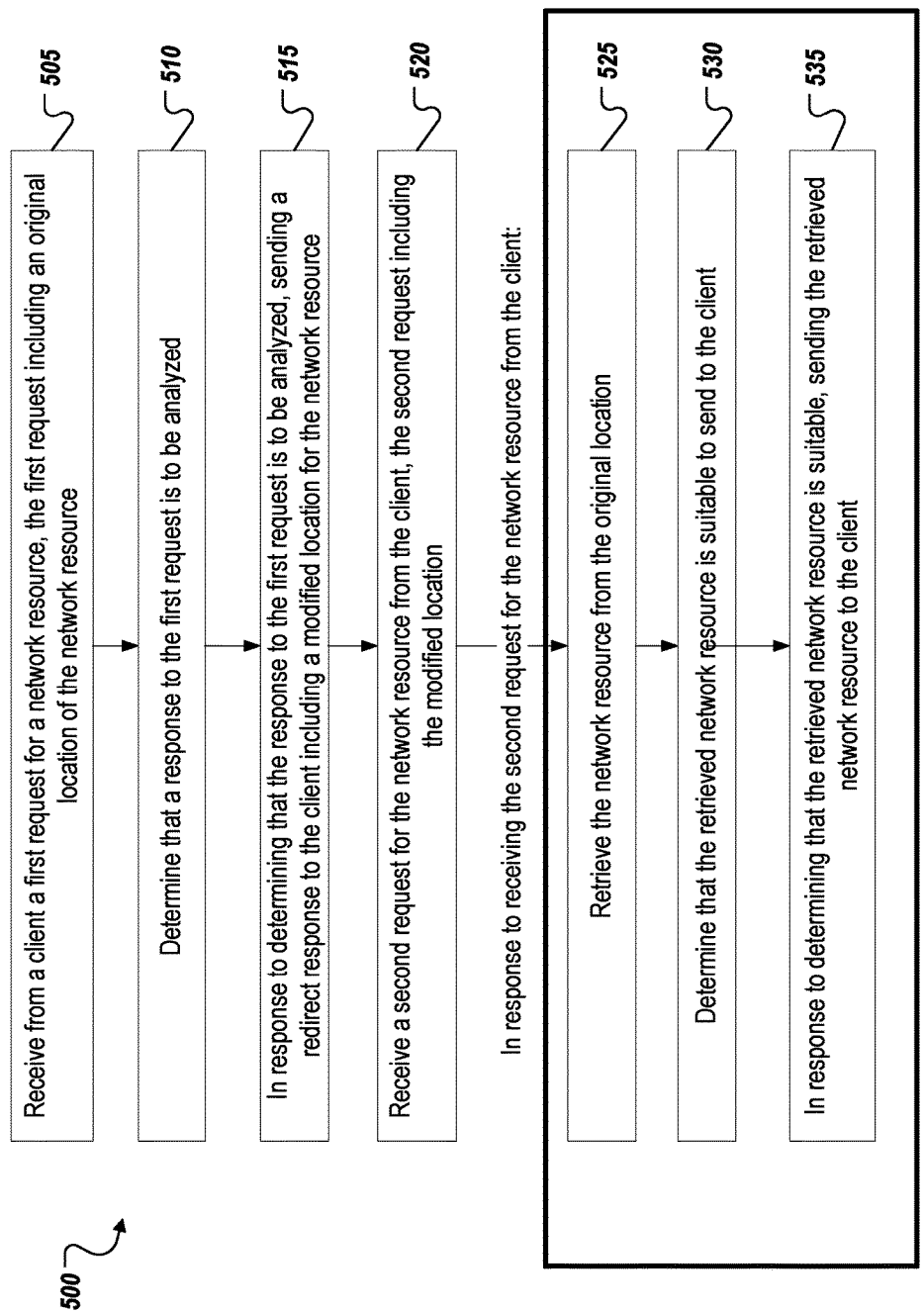
FIG. 5 is a flow chart of an example process of using redirect messages to implement content scanning.

FIG. 5 is a flow chart of an example process 500 of using redirect messages to implement content scanning. At 505, a first request for a network resource is received from a client, the first request including an original location of the network resource. In some cases, receiving the first request for the network resource includes receiving an Hypertext Transfer Protocol (HTTP) GET request, and the original location for the network resource includes a Uniform Resource Locator (URL) for the network resource.

At 510, it is determined that a response to the first request is to be analyzed. In some cases, determining that the response to the first request is to be analyzed includes determining that a domain name associated with the network resource is included in a list of domain names to be analyzed. Determining that the response to the first request is to be analyzed may be based at least in part on a resource type associated with the network resource. In some cases, the resource type may be a video file, an archive file, an executable file, an image file, or other types of resources. In some implementations, the resource type associated with the network resource is determined based on a file extension included in the original location. Determining that the response to the first request is to be analyzed may be based at least in part on a category associated with the network resource.

At 515, in response to determining that the response to the first request is to be analyzed, a redirect messages is sent to the client including a modified location for the network resource. In some implementations, sending the redirect response to the client includes sending an HTTP redirect message to the client, and the modified location includes a URL associated with an analysis server and the URL for the network resource. In some cases, determining that the response to the first request is to be analyzed is based at least in part on a domain name included in the original location for the network resource.

At 520, a second request for the network resource is received from the client, the second request including the modified location.

Actions 525 through 535 are performed in response to receiving the second request for the network resource from the client. At 525, the network resource is retrieved from the original location.

At 530, it is determined that the retrieved network resource is suitable to send to the client. In some cases, determining that the retrieved network resource is suitable to send to the client includes scanning the retrieved network resource for malicious content, wherein the determination is based at least in part on a result of the scanning. In some implementations, scanning the retrieved network resource for malicious content includes scanning the retrieved network resource for viruses. In some cases, the retrieved network resource is an executable program, and determining that the retrieved network resource is suitable to send to the client includes executing the retrieved network resource in a virtual environment, and the determination is based at least in part on an observed behavior of the retrieved network resource during execution.

At 535, in response to determining that the retrieved network resource is suitable, the retrieved network resource is sent to the client.

In some cases, the network resource is a first network resource, and a first request for a second network resource different than the first network resource is received from the client, the request including an original location for the second network resource. A redirect response may be sent to the client including a modified location for the second network resource. A second request for the second network resource may then be received from the client, the second request including the modified location. In response to receiving the second request for the second network resource from the client, a determination may be made that that the retrieved network resource is not suitable to send to the client, and an indication may be sent to the client that the network resource is not suitable.

In some implementations, the client is a first client, and a third request for the network resource is received from a second client, the third request including the original location for the network resource. A redirect response is sent to the second client including the modified location for the network resource. A fourth request for the network resource is received from the second client, the fourth request including the modified location. In response to receiving the fourth request for the network resource from the second client, a determination is made that the network resource has been previously determined to be suitable, a stored version of the network resource is sent to the second client.

Figure 6:
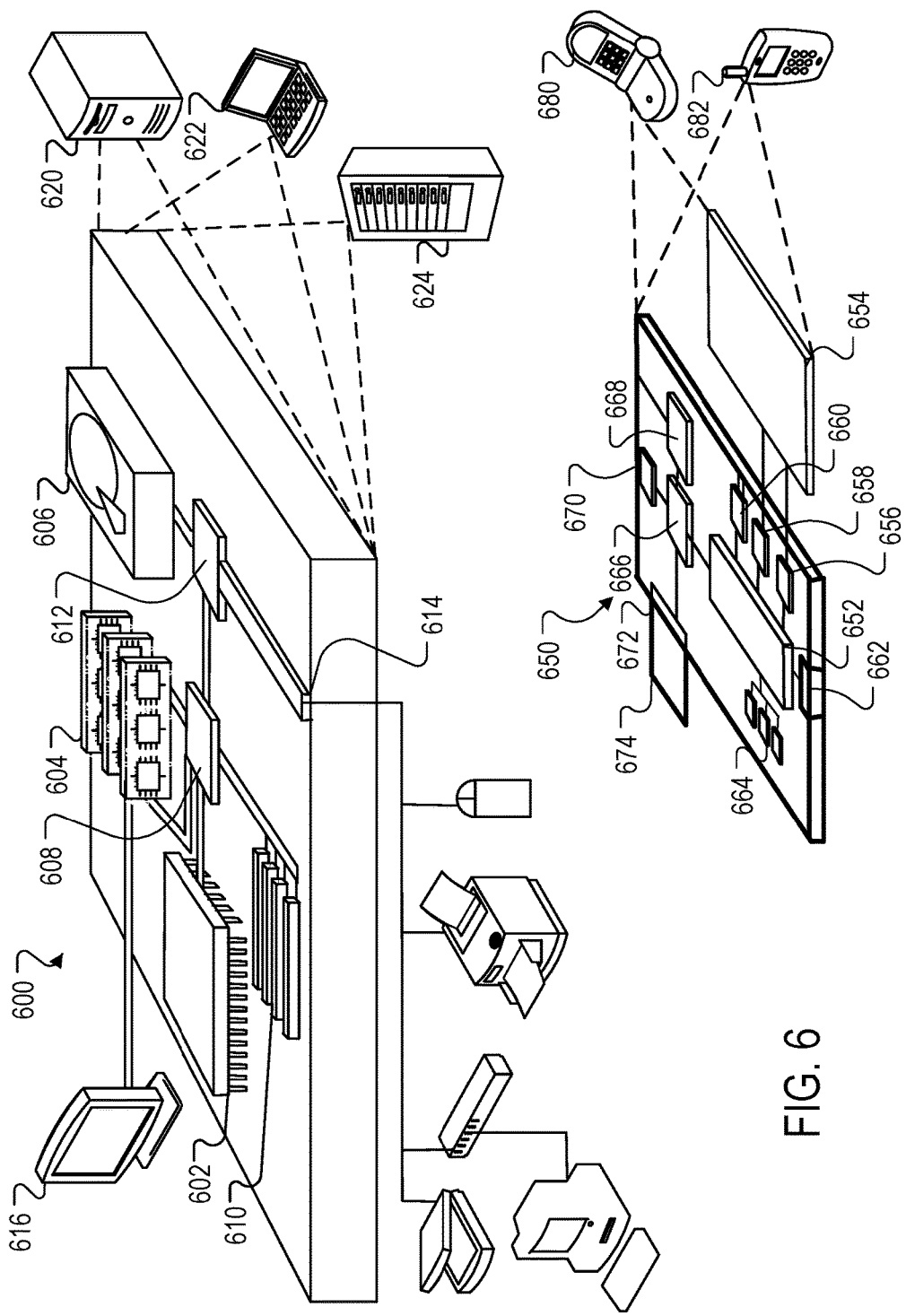
FIG. 6 is a diagram of computing devices that may be used to implement the systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 610 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:
receiving from a client a first request for a network resource;
determining that the requested network resource is to be analyzed for suitability before making the requested network resource available to the client;
in response to determining that the requested network resource is to be analyzed, sending a redirect response to the client including a modified network location different than a network location of the network resource;
receiving from the client a second request for the network resource including the modified network location from the redirect response;
in response to receiving from the client the second request for the network resource, performing a suitability analysis by:
retrieving the network resource;
applying one or more objective criteria to determine whether the retrieved network resource is suitable to send to the client; and
in response to determining that the retrieved network resource is suitable, sending the retrieved network resource to the client.

2. The method of claim 1, wherein determining that the retrieved network resource is suitable to send to the client includes:
scanning the retrieved network resource for malicious content, wherein the determination is based at least in part on a result of the scanning.

3. The method of claim 2, wherein scanning the retrieved network resource for malicious content includes scanning the retrieved network resource for viruses.

4. The method of claim 1, wherein the retrieved network resource is an executable program, and wherein determining that the retrieved network resource is suitable to send to the client includes executing the retrieved network resource in a virtual environment, and wherein the determination is based at least in part on an observed behavior of the retrieved network resource during execution.

5. The method of claim 1, wherein the network resource is a first network resource, and the modified network location is a first modified network location, the method further comprising:
receiving a first request for a second network resource different than the first network resource from the client;
sending a redirect response to the client including a second modified network location;
receiving a second request for the second network resource from the client including the second modified network location;
in response to receiving the second request for the second network resource from the client:
determining that the retrieved network resource is not suitable to send to the client; and
sending an indication to the client that the network resource is not suitable.

6. The method of claim 1, wherein receiving the first request for the network resource includes receiving an Hypertext Transfer Protocol (HTTP) GET request, and the original location for the network resource includes a Uniform Resource Locator (URL) for the network resource.

7. The method of claim 6, wherein sending the redirect response to the client includes sending an HTTP redirect message to the client, and the modified network location includes a URL associated with an analysis server and the URL for the network resource.

8. The method of claim 1, wherein determining that the response to the first request is to be analyzed includes determining that a domain name associated with the network resource is included in a list of domain names to be analyzed.

9. The method of claim 1, wherein determining that the response to the first request is to be analyzed is based at least in part on a domain name for the network resource included in the first request.

10. The method of claim 1, wherein determining that the response to the first request is to be analyzed is based at least in part on a resource type associated with the network resource.

11. The method of claim 10, wherein the resource type is one of a video file, an archive file, an executable file, or an image file.

12. The method of claim 10, wherein the resource type associated with the network resource is determined based on a file extension included in the first request.

13. The method of claim 1, wherein determining that the response to the first request is to be analyzed is based at least in part on a category associated with the network resource.

14. The method of claim 1, wherein the client is a first client, the method further comprising:
receiving a third request for the network resource from a second client, the third request including the original location for the network resource;
sending a redirect response to the second client including the modified network location;
receiving a fourth request for the network resource from the second client including the modified network location;
in response to receiving the fourth request for the network resource from the second client:
determining that the network resource has been previously determined to be suitable; and
sending a stored version of the network resource to the second client.

15. A non-transitory, computer-readable medium storing instructions operable when executed to cause at least one processor to perform operations comprising:
receiving from a client a first request for a network resource;
determining that the requested network resource is to be analyzed for suitability before making the requested network resource available to the client;
in response to determining that the requested network resource is to be analyzed, sending a redirect response to the client including a modified network location different than a network location of the network resource;
receiving from the client a second request for the network resource including the modified network location from the redirect response;
in response to receiving from the client the second request for the network resource, performing a suitability analysis by:
retrieving the network resource;
applying one or more objective criteria to determine whether the retrieved network resource is suitable to send to the client; and
in response to determining that the retrieved network resource is suitable, sending the retrieved network resource to the client.

16. The computer-readable medium of claim 15, wherein determining that the retrieved network resource is suitable to send to the client includes:
scanning the retrieved network resource for malicious content, wherein the determination is based at least in part on a result of the scanning.

17. The computer-readable medium of claim 16, wherein scanning the retrieved network resource for malicious content includes scanning the retrieved network resource for viruses.

18. The computer-readable medium of claim 15, wherein the retrieved network resource is an executable program, and wherein determining that the retrieved network resource is suitable to send to the client includes executing the retrieved network resource in a virtual environment, and wherein the determination is based at least in part on an observed behavior of the retrieved network resource during execution.

19. The computer-readable medium of claim 15, wherein the network resource is a first network resource, and the modified network location is a first modified network location, the operations further comprising:
receiving a first request for a second network resource different than the first network resource from the client;
sending a redirect response to the client including a second modified network location;
receiving a second request for the second network resource from the client including the second modified network location;
in response to receiving the second request for the second network resource from the client:
determining that the retrieved network resource is not suitable to send to the client; and
sending an indication to the client that the network resource is not suitable.

20. A system comprising:
memory for storing data; and
one or more processors operable to perform operations comprising:
receiving from a client a first request for a network resource;
determining that the requested network resource is to be analyzed for suitability before making the requested network resource available to the client;
in response to determining that the requested network resource is to be analyzed, sending a redirect response to the client including a modified network location different than a network location of the network resource;
receiving from the client a second request for the network resource including the modified network location from the redirect response;
in response to receiving from the client the second request for the network resource, performing a suitability analysis by:
retrieving the network resource;
applying one or more objective criteria to determine whether the retrieved network resource is suitable to send to the client; and
in response to determining that the retrieved network resource is suitable, sending the retrieved network resource to the client.

\* \* \* \* \*